(12) United States Patent
Ferguson et al.

(10) Patent No.: US 6,981,173 B2
(45) Date of Patent: Dec. 27, 2005

(54) REDUNDANT MEMORY SEQUENCE AND FAULT ISOLATION

(75) Inventors: Patrick L. Ferguson, Cypress, TX (US); Robert A. Scheffler, Austin, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 542 days.

(21) Appl. No.: 09/965,877

(22) Filed: Sep. 28, 2001

(65) Prior Publication Data

US 2003/0070113 A1    Apr. 10, 2003

(51) Int. Cl.[7] .............................................. G06F 11/00
(52) U.S. Cl. ......................................... 714/5; 710/302
(58) Field of Search ...................... 714/5, 7; 711/115; 710/302

(56) References Cited

U.S. PATENT DOCUMENTS

| | | | | |
|---|---|---|---|---|
| 5,313,626 A | | 5/1994 | Jones et al. ................. | 395/575 |
| 5,331,646 A | | 7/1994 | Krueger et al. ............. | 371/40.1 |
| 5,367,669 A | | 11/1994 | Holland et al. .............. | 395/575 |
| 5,784,576 A | * | 7/1998 | Guthrie et al. .............. | 710/302 |
| 6,098,132 A | | 8/2000 | Olarig et al. ................ | 710/103 |
| 6,223,301 B1 | * | 4/2001 | Santeler et al. ................. | 714/6 |
| 6,715,104 B2 | * | 3/2004 | Imbert de Tremiolles et al. ....... | 714/25 |
| 6,766,469 B2 | * | 7/2004 | Larson et al. .................. | 714/7 |
| 2002/0129186 A1 | * | 9/2002 | Emerson et al. ............ | 710/302 |
| 2003/0093605 A1 | * | 5/2003 | Abe et al. .................... | 710/302 |

* cited by examiner

*Primary Examiner*—Robert Beausoliel
*Assistant Examiner*—Marc M. Duncan

(57) ABSTRACT

A computer system includes a plurality of memory modules that contain semiconductor memory, such as DIMMs. The system includes a host/data controller that utilizes an XOR engine to store data and parity information in a striped fashion across on a plurality of memory cartridges each containing a plurality of memory modules to create a redundant array of industry standard DIMMs (RAID). Each memory cartridge includes an independent memory controller and a corresponding control mechanism in the host/data controller to interpret the independent transitioning of each memory cartridge between various states, including a redundant-ready and a powerdown state to facilitate "hot-plug" capabilities utilizing the removable memory cartridges. Fault information may be passed between the individual memory controllers and the host/data controller to facilitate expedient fault isolation.

20 Claims, 3 Drawing Sheets

REDUNDANT MEMORY SEQUENCE AND FAULT ISOLATION

BACKGROUND OF THE INVENTION

1. Field of the Invention

This invention relates generally to memory systems and, more particularly, to state operation and fault isolation in redundant memory systems.

2. Background of the Related Art

This section is intended to introduce the reader to various aspects of art which may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Computers today, such as the personal computers and servers, rely on microprocessors, associated chip sets, and memory chips to perform most of their processing functions. Because these devices are integrated circuits formed on semiconducting substrates, the technological improvements of these devices have essentially kept pace with one another over the years. In contrast to the dramatic improvements of the processing portions of a computer system, the mass storage portion of a computer system has experienced only modest growth in speed and reliability. As a result, computer systems failed to capitalize fully on the increased speed of the improving processing systems due to the dramatically inferior capabilities of the mass data storage devices coupled to the systems.

While the speed of these mass storage devices, such as magnetic disk drives, has not improved much in recent years, the size of such disk drives has become smaller while maintaining the same or greater storage capacity. Furthermore, such disk drives have become less expensive. To capitalize on these benefits, it was recognized that a high capacity data storage system could be realized by organizing multiple small disk drives into an array of drives. However, it was further recognized that large numbers of smaller disk drives dramatically increased the chance of a disk drive failure which, in turn, increases the risk of data loss. Accordingly, this problem has been addressed by including redundancy in the disk drive arrays so that data lost on any failed disk drive can be reconstructed through the redundant information stored on the other disk drives. This technology has been commonly referred to as "redundant arrays of inexpensive disks" (RAID).

To date, at least five different levels of RAID have been introduced. The first RAID level utilized mirrored devices. In other words, data was written identically to at least two disks. Thus, if one disk failed, the data could be retrieved from one of the other disks. Of course, a level 1 RAID system requires the cost of an additional disk without increasing overall memory capacity in exchange for decreased likelihood of data loss. The second level of RAID introduced an error code correction (ECC) scheme where additional check disks were provided to detect single errors, identify the failed disk, and correct the disk with the error. The third level RAID system utilizes disk drives that can detect their own errors, thus eliminating the many check disks of level 2 RAID. The fourth level of RAID provides for independent reads and writes to each disk which allows parallel input-output operations. Finally, a level 5 RAID system provides memory striping where data and parity information are distributed in some form throughout the memory segments in the array.

The implementation of data redundancy, such as in the RAID schemes discussed above, creates fault tolerant computer systems where the system may still operate without data loss even if one segment or drive fails. This is contrasted to a disk drive array in a non-fault tolerant system where the entire system fails if any one of the segments fail. Of course, it should be appreciated that each RAID scheme necessarily trades some overall storage capacity and additional expense in favor of fault tolerant capability. Thus, RAID systems are primarily found in computers performing relatively critical functions where failures are not easily tolerated. Such functions may include, for example, a network server, a web server, a communication server, etc.

One of the primary advantages of a fault tolerant mass data storage system is that it permits the system to operate even in the presence of errors that would otherwise cause the system to malfunction. As discussed previously, this is particularly important in critical systems where downtime may cause relatively major economic repercussions. However, it should be understood that a RAID system merely permits the computer system to function even though one of the drives is malfunctioning. It does not necessarily permit the computer system to be repaired or upgraded without powering down the system. To address this problem, various schemes have been developed, some related to RAID and some not, which facilitate the removal and/or installation of computer components, such as a faulty disk drive, without powering down the computer system. Such schemes are typically referred to as "hot plug" schemes since the devices may be unplugged from and/or plugged into the system while it is "hot" or operating. These schemes which facilitate the hot-plugging of devices such as memory cartridges or segments, may be implemented through complex logic control schemes.

Although hot plug schemes have been developed for many computer components, including microprocessors, memory chips, and disk drives, most such schemes do not permit the removal and replacement of a faulty device without downgrading system performance to some extent. Furthermore, because memory chips have been traditionally more reliable than disk drives, error detection and correction schemes for memory chips have generally lagged behind the schemes used for disk drives.

However, certain factors may suggest that the reliability of semiconductor memory systems may also require improvement. For instance, in the near future, it is believed that it will be desirable for approximately 50% of business applications to run continuously 24 hours a day, 365 days a years. Furthermore, in 1998, it was reported that the average cost of a minute of downtime for a mission-critical application was $10,000.00. In addition to the increasing criticality of such computer systems and the high cost of downtime of such systems, the amount of semiconductor memory capacity of such systems has been increasing steadily and is expected to continue to increase. Although semiconductor memories are less likely to fail than disk drives, semiconductor memories also suffer from a variety of memory errors.

Specifically, "soft" errors account for the vast majority of memory errors in a semiconductor memory. Such soft errors include cosmic rays and transient events, for instance, that tend to alter the data stored in the memory. Most soft errors are single bit errors that are correctable using standard ECC technology. However, some percentage of these errors are multi-bit errors that are uncorrectable by current ECC technology. Furthermore, the occurrence of soft errors increases linearly with memory capacity. Therefore, as memory capacities continue to increase, the number of soft errors will similarly increase, thus leading to an increased likelihood that the system will fail due to a soft error. Semiconductor memories may also suffer from "hard" errors. Such hard errors may be caused by over voltage conditions which destroy a portion of the memory structure, bad solder joints, malfunctioning sense amplifiers, etc. While semiconductor memories are typically subjected to rigorous performance and burn-in testing prior to shipment, a certain percentage of these memories will still malfunction after being integrated into a computer system. Again, as the number of memory chips and the memory capacities of computer systems increase, a likelihood of a semiconductor memory developing a hard error also increases. Fault isolation, to identify the source and nature of memory errors, may be advantageous in the timely correction of such errors.

The present invention may be directed to one or more of the problems set forth above.

BRIEF DESCRIPTION OF THE DRAWINGS

The foregoing and other advantages of the invention will become apparent upon reading the following detailed description and upon reference to the drawings in which.

DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
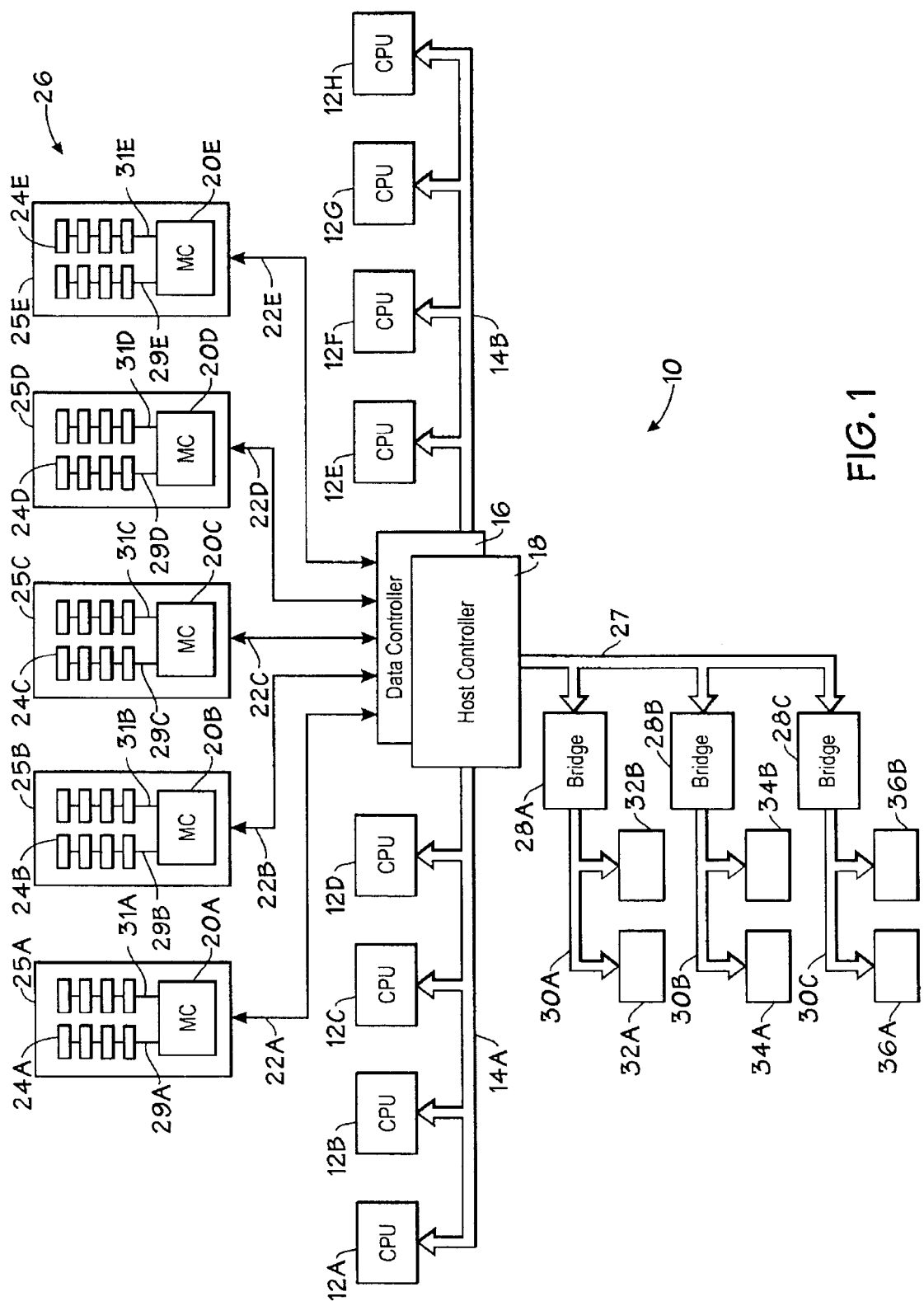
FIG. 1 is a block diagram illustrating an exemplary computer system in accordance with the present invention.

Turning now to the drawings and referring initially to FIG. 1, a block diagram of an exemplary computer system with multiple processor buses and an I/O bus, generally designated as reference numeral 10, is illustrated. The computer system 10 typically includes one or more processors or CPUs. In the exemplary embodiment, the system 10 utilizes eight CPUs 12A–12H. The system 10 utilizes a split-bus configuration in which the CPUs 12A–12D are coupled to a first bus 14A and the CPUs 12E–12H are coupled to a second bus 14B. It should be understood that the processors or CPUs 12A–12H may be of any suitable type, such as a microprocessor available from Intel, AMD, or Motorola, for example. Furthermore, any suitable bus configuration may be coupled to the CPUs 12A–12H, such as a single bus, a split-bus (as illustrated), or individual buses. By way of example, the exemplary system 10 may utilize Intel Pentium III processors and the buses 14A and 14B may operate at 100/133 MHz.

Each of the buses 14A and 14B is coupled to a chip set which includes a host controller 16 and a data controller 18. In this embodiment, the data controller 18 is effectively a data cross-bar slave device controlled by the host controller 16. The data controller 18 may be used to store data from one area of the system 10 awaiting transfer to a requesting area of the system 10 and to implement data manipulation and checking operations. Because of the master/slave relationship between the host controller 16 and the data controller 18, the chips may be referred to together as the host/data controller 16, 18. The host/data controller 16, 18 is further coupled to main memory 24 via one or more memory controllers. In this particular example, the host/data controller 16, 18 is coupled to five memory controllers 20A–20E via five individual bus segments 22A–22E, respectively. The individual bus segments 22A–22E may be referred to collectively as the "MNET" or "MNET bus." Each of the memory controllers 20A–20E is further coupled to a segment of main memory designated as 24A–24E, respectively. As discussed in detail below, each of the memory segments or modules 24A–24E is typically comprised of dual inline memory modules (DIMMs). Further, each memory module 24A–24E and respective memory controller 20A–20E may comprise a single memory cartridge 25A–25E which may be removable. In the present configuration, data may be stored in a "4+1" parity striping pattern wherein one of the memory cartridges 25A–25E is used to provide redundancy for the collective memory system 26, thereby providing hot plug capabilities for the memory cartridges 25A–25E.

The memory segments may be organized on a single channel or on 2N channels, where N is an integer. In this particular embodiment, each of the memory segments 24A–24E is divided into two channels—a first channel 29A–29E and a second channel 31A–31E, respectively. Since each memory segment 24A–24E in this embodiment is capable of containing up to eight DIMMs, each channel is adapted to access up to four of the eight DIMMs. Because this embodiment includes two channels, each of the memory controllers 20A–20E essentially includes two independent memory controllers.

As will be appreciated from the discussion herein, the number of memory segments 24 may vary depending upon the type of memory system desired. In general, redundant memory systems will utilize two or more memory segments 24. Although the five memory segments 24A–24E illustrated in the exemplary embodiment facilitates a "4+1" striping pattern of data and parity information as discussed in detail below, a memory system having two memory segments 24 may be used in which data is mirrored on each segment to provide redundancy. Similarly, a memory system having three or more memory segments may be used to provide various combinations of data and parity striping.

The host/data controller 16,18 is typically coupled to one or more bridges 28A–28C via a suitable bus 27. The opposite side of each bridge 28A–28C is coupled to a respective bus 30A–30C, and a plurality of peripheral devices 32A and B, 34A and B, and 36A and B may be coupled to the respective buses 30A, 30B, and 30C. The bridges 28A–28C may be any of a variety of suitable types, such as PCI, PCI-X, EISA, AGP, etc.

Each of the memory controllers 20A–20E and its associated main memory segment 24A–24E forms a portion of the main memory array 26. The five memory segment 20A–20E operate in lock-step. In this example, each of the memory controllers 20A–20E handle a separate quad-word of each cacheline of data (assuming a 32 byte cacheline) that is being transferred to or from the host and data controllers 16 and 18. For example, the memory controller 20A handles the first quad-word of every data read and write transaction, the memory controller 20B handles the second quad-word, the memory controller 20C handles the third quad-word, and the memory controller 20D handles the fourth quad-word. Instead of receiving one of the four quad-words, the memory controller 20E handles data parity for the four quad-words handled by the memory controllers 20A–20D. Thus, as described below, the memory array 26 forms a "redundant array of industry standard DIMMs" (RAID) memory structure.

As will be explained in greater detail below, during a data read operation, the host/data controller 16,18 receives four quad-words of data plus parity from the five memory controllers 20A–20E, validates data integrity of each quad-word and parity using ECC codes, and, if necessary, corrects bad data using an exclusive OR (XOR) engine before forwarding the data to its destination. During a data write operation, the host/data controller 16,18 uses the XOR engine to calculate data parity and transfers the four quad-words of data and parity to the five respective memory controllers 20A–20E. In this embodiment, all data transfers between the host/data controller 16,18 and the five memory controllers 20A-20E are an entire cacheline, and partial writes are translated into read-modify-write operations.

Furthermore, as also described in greater detail below, the five bus segments 22A–22E (MNET bus) provide electrical isolation to each of the respective five memory controllers 20A–20E to facilitate hot-plug removal and/or replacement of each of the five memory segments 24A–24E. The RAID functionality described herein allows any one of the five memory segments 24A–24E to be removed while the system 10 continues to operate normally, albeit not in a redundant mode. Once the removed memory segment is reinstalled, the data is rebuilt from the other four memory segments, and the memory system resumes operation in its redundant, or fault-tolerant, mode.

In this embodiment, each of the memory segments 24A–24E may include one to eight dual inline memory modules (DIMMs). Typically, such DIMMs are organized in an X4 or an X8 fashion. In other words, the memory chips on the DIMM are either 4 bits wide or 8 bits wide. To produce a 72 bit quad-word using an X4 memory organization, an exemplary DIMM may include nine 4 bit wide memory chips located on one side of the DIMM and nine 4 bit wide memory chips located on the opposite side of the DIMM. Conversely, to produce a 72 bit quad-word using an X8 memory organization, a memory chips located on a single side of the DIMM. The memory chips on each DIMM are typically selected from one or more DRAM technologies, such as synchronous DRAM, double data rate SDRAM, direct-RAM BUS, and synclink DRAM.

Figure 2:
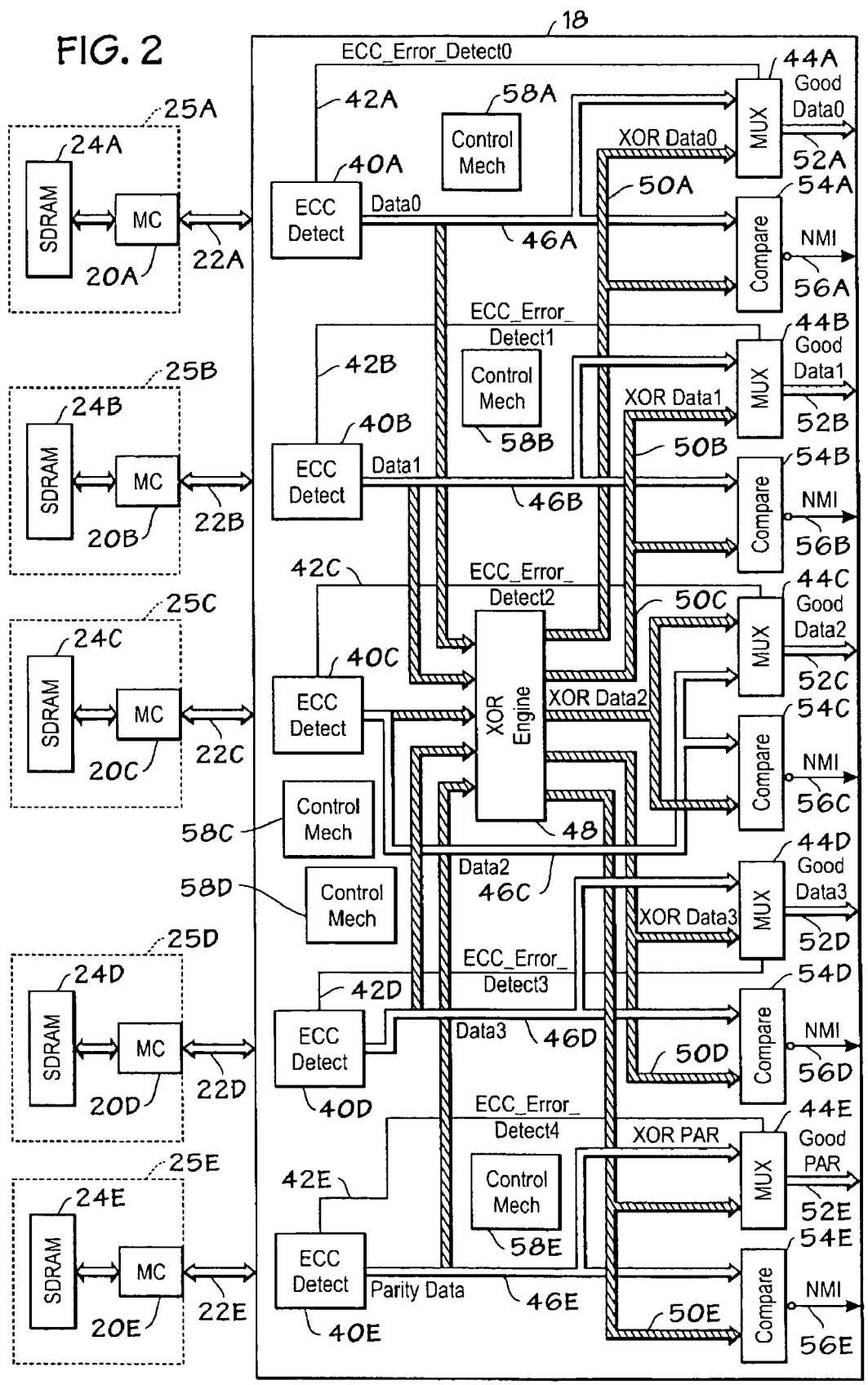
FIG. 2 is a block diagram generally illustrating one implementation of a RAID architecture in accordance with the present invention.

The manner in which the exemplary "4+1" RAID architecture functions will now be explained with reference to FIG. 2. During a memory read operation, a quad-word from each of the first four memory segments 24A–24D and parity from the one remaining memory segment 24E are transmitted to the respective memory controllers 20A–20E. While the memory segment 24E is designated here for parity, the present architecture allows any of the memory segments 24A–24E to be used for parity while the system is in a redundant mode of operation. When operating in X4 memory mode, each of the memory controllers 20A–20E uses an ECC algorithm (such as a P6 ECC algorithm) to detect single bit memory errors and a single bit error correction algorithm to correct any single bit errors detected by the ECC algorithm. When operating in X8 memory mode, each of the memory controllers 20A–20E uses an ECC algorithm to detect single bit errors, but such errors are not corrected by the memory controllers 20A–20E.

Indeed, it should be appreciated that parity information can detect a single bit error, but it cannot even detect, much less correct, double bit errors, multi-bit errors in a nibble or a byte, or any other type of error. Standard ECC algorithms, on the other hand, are more capable. ECC can detect and correct single bit errors, and can detect double bit errors and multi-bit errors in a nibble. ECC cannot detect multiple errors in both nibbles of a byte. However, as will be appreciated from the discussion herein, the RAID architecture can detect and correct single bit errors, double bit errors, multi-bit errors in a nibble, and multi-bit errors in a byte, as well as detect errors in other situations.

Once the memory controllers 20A–20E have processed the data as discussed above, the data is transferred via the respective buses 22A–22E to the host/data controller 16,18. The data controller 18 includes ECC modules 40A–40E to detect multi-bit errors in each of the four quad-words and the parity information delivered from the respective memory controllers 20A–20E. The outputs 42A–42E of each of the ECC modules 40A–40E are coupled to a respective multiplexer 44A–44E. Based on the output 42A–42E of each of the ECC modules 40A–40E, each respective multiplexer 44A–44E selects between the original data delivered to the multiplexers 44A–44E on respective buses 46A–46E and the re-created data generated by the exclusive OR (XOR) engine 48 delivered to the multiplexers 44A–44E via the respective buses 50A–50E. Specifically, if one of the ECC modules 40A–40E detects a multi-bit error, the ECC module 40A–40E switches its respective multiplexer 44A–44E such that the bad data on the respective bus 46A–46E is replaced by the good re-created data available on the respective bus 50A–50E. Thus, when operating in X4 memory mode, the XOR engine 48 is used to correct multi-bit errors only, while when operating in X8 memory mode, the XOR engine 48 corrects both single bit errors and multi-bit errors. It should be noted that while multiplexers 44A–44E may be provided to facilitate the selection of the original data and the data being recreated by the XOR engine 48 when any one of the memory segments 24A–24E is configured to produce parity data, the multiplexer associated with the parity segment (here multiplexer 44E) may not be used. The multiplexer 44E may be unnecessary since there is no reason to correct the parity data. The parity segment, here segment 24E, is used to recreate erroneous data in the remaining segments 24A–24D. However, generally speaking, any of the memory segments 24A–24E may be used for parity data. Thus, each segment 24A–24E has a corresponding multiplexer 44A–44E to select between original data and corrected data generated by the XOR engine 48.

A few aspects of this type of RAID functionality should be understood. First, when operating in X4 memory mode, each memory segment 24A–24E may exhibit a single bit error which may be corrected without even triggering the use of the re-created data generated by the XOR engine 48. However, only a single multi-bit error on one of the memory segments 24A–24E can be corrected per each memory transaction using the XOR engine 48. Conversely, when operating in X8 memory mode, the host/data controller 16,18 can correct only one single bit error or multi-bit error in one of the memory segments 24A–24E. Thus, if more than one of the memory segments 24A–24E exhibits a single bit error or a multi-bit error in X8 memory mode, or if more than one of the memory segments 24A–24E exhibits a multi-bit error in X4 memory mode, the XOR engine 48 will be unable to create good data to be transmitted out of the host/data controller 16,18 on the buses 52A–52E. In these circumstances, the comparator circuits 54A–54E, which receive the data on the respective bus errors 46A–46E and 50A–50E, deliver a non-maskable interrupt (NMI) on the respective lines 56A–56E. The NMI is typically delivered to the requesting device to indicate that a memory error has occurred and that the requested data cannot be delivered.

Each memory segment 24A–24E also has an associated control mechanism 58A–58E in the data controller 18 which is configured to facilitate the power up and power down procedures associated with each bus segment 22A–22E. The operation of each control mechanism 58A–58E may be described by the state diagram illustrated in FIG. 3 which determines the status of each corresponding bus segment 22A–22E which ultimately results in an NMI, correction of data, etc. To facilitate the hot-plugging capabilities of the memory array 26, the transition of each bus segment 22A–22E advantageously has a corresponding control mechanism 58A–58E. State control is generally dictated by the host controller 16 or CPU 12A–12H. The data controller 18 and the memory controller 20A–20E generally receive the state control commands from the host controller 16 or CPU 12A–12H. The control mechanisms 58A–58E are used to provide the current state information in the data controller 18. The state diagram illustrates the various states and state transitions for memory bus 22A–22E associated with each memory segment 24A–24E.

Generally, if each of the memory segments 24A–24E is functional, the memory array 26 operates in a redundant mode. More specifically, if an associated bus segment 22A–22E is in the redundant-ready state 60, the memory array 26 can operate in a redundant mode. If one or more of the bus segments 22A–22E are in one of the other states, the memory array 26 cannot operate in a redundant mode.

When a single bus segment 22A–22E is fully operational to include data error detection and correction, the associated bus segment 22A–22E is operating in a redundant-ready state 60. When each bus segment 22A–22E is in the redundant-ready state 60, the system 10 may be in a redundant mode of operation. If the system 10 is operational, at least four of the five bus segments 22A–22E will be in a redundant-ready state 60. The redundant-ready state 60 indicates that a memory segment 24A–24E is fully operational and may be used for data storage and correction/detection. It is possible however that in certain instances, a bus segment 22A–22E may be in the redundant-ready state 60 but is not currently being used to obtain data if the system 10 is operating in a non-redundant mode. While the bus segment 22A–22E is in the redundant-ready state 60, the original data sent from the ECC modules 40A–40E along path 46A–46E will be delivered to the requesting device via buses 52A–52E. Conversely, if a bus segment 22A–22E is not in the redundant ready state 60 and the system 10 is operating in a non-redundant mode, the data delivered along the bus 52A–52E will correspond to the output of the XOR engine 48 delivered to the multiplexer 44A–44E via path 50A–50E.

When a bus segment 22A–22E is in a powerdown state 62, there is no power being supplied to the memory cartridge 25A–25E. This is the initial state of the bus segment 22A–22E. Essentially, the powerdown state 62 is implemented when a memory cartridge 25A–25E is being replaced or the entire system 10 is taken off-line. The memory cartridge 25A–25E may be replaced for any number of reasons such as a failed DIMM or memory controller 20A–20E on the memory cartridge 25A–25E. By implementing individual control mechanisms 58A–58E to monitor the state of an individual memory bus 22A–22E a single memory cartridge 25A–25E may be replaced while the remaining bus segments 22A–22E operate in the redundant-ready state 60. As previously discussed, if four of the five bus segments 22A–22E are in the redundant-ready state 60, the memory array 26 can continue to function normally, albeit in a non-redundant mode of operation.

When a memory controller 20A–20E is brought online from the powerdown state 62, power is applied to the memory cartridge 25A–25E and the bus segment 22A–22E transitions to the powerup state 64. The bus segment 22A–22E remains in the powerup state 64 until the bus segment 22A–22E is properly powered up and synchronized with a system clock in the system 10 and the other bus segments 22A–22E such that the bus segments 22A–22E are configured to operate in lock-step. While a bus segment 22A–22E is in the powerup state 64, all write interfaces are driven to an idle state and then read interface inputs are tristated. Once the bus synchronization is complete, the read and write interfaces return to normal signal operation and the memory segment transitions to the disable-up state 66.

The disable-up state 66 is an intermediate state between the powerup state 64 and the redundant-ready state 60. By providing a disable-up state 66 following the transition from the powerup state 64, configuration cycles may be delivered from the corresponding memory controller 20A–20E with ECC detection. Although configuration cycles may be transferred while the bus segment 22A–22E is in the disable-up state 66, the corresponding error checking in the data controller 18 (i.e., ECC detect 40A–40E) is disabled and the corresponding memory data is reconstructed using the remaining bus segments 22A–22E and the XOR engine 48. Thus, the disable-up state 66 allows for reading and writing to the memory controller 20A–20E for configuration and testing, and disallows the transfer of actual data from the memory segment 24A–24E for use as read data.

Similarly, the disable-down state 68 provides an intermediate transition state between the redundant-ready state 60 and the powerdown state 62. By providing a disable-down state 68 immediately precedent to the transition to the powerdown state 62, configuration cycles may be replaced with data from an enabled memory controller 20A–20E with ECC detection. Although configuration cycles may be transferred from the memory controller 20A–20E while the bus segment 22A–22E is in the disable-down state 68, the corresponding error checking in the data controller 18 (i.e., ECC detect 40A–40E) is disabled, and the corresponding memory data is reconstructed using the remaining bus segments 22A–22E and the XOR engine 48. The disable-down state 68 allows for the completion of a current data transfer from the bus segment 22A–22E to the data controller 18 before the power is actually cut from the memory cartridge 25A–25E. After completion of the current data transfer, data and configuration cycles are ignored since the bus segment 22A–22E is set to subsequently transition to the powerdown state 62.

The verify/replace state 70 is part of the rebuilding state of the data in a memory segment 24A–24E which has been brought on-line during a hot-plug operation. A bus segment 22A–22E in the verify/replace state 70 performs error detection, but replaces transferred data with reconstructed data from the XOR engine 48, regardless of the error status. The purpose of the verify/replace state 70 is to verify that the data is correct by writing to the memory segment 24A–24E and then reading the data from the memory segment 24A–24E to insure that the data was correctly written. Configuration cycles may be delivered to and from the memory controller 20A–20E while it resides in the verify/replace state 70. Once the data is verified as being correct, the bus segment 22A–22E may transition to the redundant-ready state 60 for system 10 operation in the redundant mode.

Figure 3:
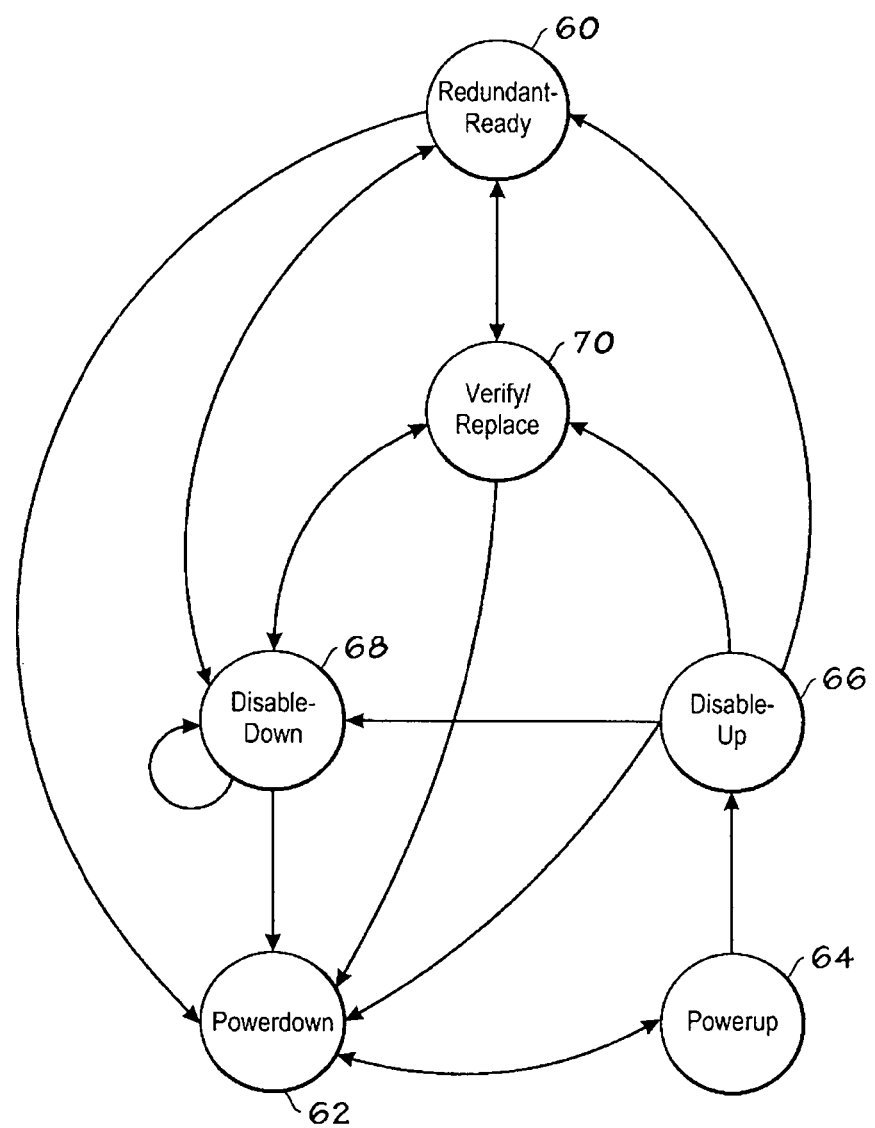
FIG. 3 is a state diagram illustrating the various states for a segment of memory in accordance with the present invention.

As indicated by the state diagram illustrated in FIG. 3, the control mechanism 58A–58E may interpret transitions between the various states based on software commands implemented by the data controller 18 and dependent on the particular state of the system 10. For instance, if the entire system 10 is taken off-line and each of the memory segments 24A–24E is then transitioned from a powerdown state 62 to the redundant-ready state 60, each bus segment 22A–22E may transition from the powerdown state 62 to the powerup state 64, then to the disable-up state 66, and then directly to the redundant-ready state 60, since the verify/replace state 70 is not used. If on the other hand, a single memory segment 24A–24E is being replaced and hot-plugged into the system 10, a transition from the disable-up state 66 to the verify/replace state 70 is advantageous and may be used to verify the functionality of the hot-plugged bus segment 22A–22E. Various system interrupts and software mechanisms may facilitate the transition of a bus segment 22A–22E among the various states, which are illustrated by the arrows in the state diagram.

The state transitions of each bus segment 22A–22E may correspond to fault isolation and error detection and/or error correction in a particular bus segment 22A–22E. However, further fault isolation in the data controller 18 may be advantageous. For instance, error detection in an ECC module 40A–40E only identifies the path of a particular error. The error may be a hard or soft error and may reside in the memory segment 24A–24E, or it may have been introduced at some point between the memory segment 24A–24E and the ECC module 40A–40E, such as on the bus segment 22A–22E. By comparing the ECC results obtained in the memory controller 20A–20E with the ECC results obtained in the data controller 18 (i.e. the ECC modules 40A–40E), faults can be characterized to determine whether the error occurred in the data stored in the memory segment 24A–24E or whether the error was injected on the bus segment 22A–22E.

As previously described, each memory controller 20A–20E may comprise ECC fault detection capabilities. As data is passed from the memory segment 24A–24E to the data controller 18 via a bus segment 22A–22E, each data word being retrieved from the memory segment 24A–24E is checked for single bit memory errors by typical ECC methods. If no errors are detected in the ECC module 40A–40E (or in the ECC detection in each memory controller 20A–20E), the data is simply passed through the data controller 18 and eventually to a requesting device via the output buses 52A–52E. If a correctable single-bit error is detected by the memory controller 20A–20E, the data is corrected by memory controller 20A–20E. When the corrected data is sent to the data controller 18 via the bus segments 22A–22E, the ECC modules 40A–40E in the data controller 18 will not detect any erroneous data words since the single bit error was corrected by the memory controller 20A–20E. If an error is detected and corrected by the ECC logic in the memory controller 20A–20E, a message is sent from the memory controller 20A–20E to the data controller 18 indicating that a memory error has been detected and corrected. This error flag may then be used by the data controller 18 for comparison with the error results in the ECC module 40A–40E. If the ECC module 40A–40E detects a single-bit error that was not detected by the ECC logic in the memory controller 20A–20E, the data error may have been injected at some point subsequent to the removal of the data from memory. This information may be important to expediting the isolation of the source of the error. If for instance, the error was not detected in the memory controller 20A–20E, the error may be a hard error, such as a connection error, which was injected on the corresponding bus segment 22A–22E. This determination would mitigate unnecessary scrubbing of the memory segment 24A–24E associated with the error.

If a multi-bit error is detected by one of the memory controllers 20A–20E, the memory controller 20A–20E, having only standard ECC capabilities can detect the errors but will not be able to correct the data. Therefore, the erroneous data is passed to the ECC module 40A–40E along with an error flag indicating that a multi-bit error was detected. Like the memory controller 20A–20E, the ECC module can only detect but not correct the multi-bit errors. The erroneous data words may be passed to the RAID memory engine 48 for correction. As with the single-bit error flag, the passing of the multi-bit error flag to the data controller 18 will help to expedite fault isolation.

The error flag provides error information from the memory controller 20A–20E to the data controller 18. The error flag from the memory controller 20A–20E, indicating the detection of an error, may be advantageously embedded in an existing signal. In the present embodiment, the detection information is embedded in the "RxFRAME#" signal, where "x" indicates the corresponding memory segment 0–4 (or memory segment A–E, herein). In the present system, standard memory transactions are implemented by asserting RxFRAME# to indicate the start of a transaction. Typically, once RxFRAME# is asserted, the remainder of the signal is ignored. In accordance with current system protocol, RxFRAME# is asserted for at least two clock cycles. Since the first clock cycle indicating the assertion of the RxFRAME# signal is the only part of the signal which is typically used, the second clock cycle is typically ignored. The present system incorporates internal clocks in the memory controller 20A–20E to embed error status in the second clock cycle of the RxFRAME# signal. As can be appreciated by those skilled in the art, the error flag can be sent from the memory controller 20A–20E to the data controller 18 via any data bus. More advantageously, the error flag may be embedded in an existing bus signal. The present embodiment, incorporating the RxFRAME# signal is illustrated to provide an exemplary embodiment of the present technique and should not be interpreted as a limitation.

When RxFRAME# is not asserted, no data is loaded into data registers in the memory controller 20A–20E to await transfer to the data contoller 18. Once RxFRAME# is asserted, the transfer of a full cacheline of data is initiated. Once RxFRAME# is asserted, it is sampled by internal clocks "RxDSTB" and "RxDSTBL" to start the transfer of data. The internal clocks RxDSTB and RxDSTBL reside on each memory bus segment 22A–22E. In the second half of the transfer (i.e. on the second clock cycle with reference to a system clock), the RxFRAME# is sampled as a data bit by each of the internal clocks RxDSTB and RxDSTBL and sent to the data controller 18 as two encoded bits. Once the data controller 18 receives the encoded information embedded in the previously unused portion of the RxFRAME# signal, the data can be compared to error results found in the ECC modules 40A–40E. As previously described, a comparison of the error results found in the memory controller 20A–20E and the ECC module 40A–40E may provide information which may be useful in isolating the source of the errors and the possible response to such errors. Table 1 below indicates an exemplary encoding scheme that may be used for error flagging in a signal, such as the RxFRAME#.

TABLE 1

Memory Controller Error Status

| RxFRAME# Bits | Encoding Status |
|---|---|
| 00 | Good Data |
| 01 | Corrected Single Bit Error |
| 10 | Uncorrected Single Bit Error |
| 11 | Multi-Bit Error |

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A computer system comprising:
   a memory system comprising a plurality of memory cartridges, each of the plurality of memory cartridges comprising at least one memory device and a memory controller; and
   a data controller comprising a plurality of control mechanisms, each of the plurality of control mechanisms corresponding to a respective one of the memory controllers and configured to independently interpret the transition of the corresponding memory cartridge between a first state of operation and a second state of operation, wherein the first state of operation permits the memory cartridge to be used to store data in a redundant memory array and wherein the second state of operation prevents the memory cartridge from being used to store data in a redundant memory array, and wherein the second state of operation comprises one of a disable-up state, a disable-down state, a powerup state, a powerdown state, and a verify/replace state of operation.

2. The computer system, as set forth in claim 1, wherein the at least one memory device comprises a dual inline memory module (DIMM).

3. The computer system, as set forth in claim 1, wherein the first state of operation comprises a redundant-ready state of operation.

4. The computer system, as set forth in claim 1, wherein the memory system is configured to operate in a redundant mode when each of the plurality of memory cartridges is in the redundant-ready state.

5. The computer system, as set forth in claim 1, wherein the plurality of memory cartridges comprises five memory cartridges.

6. The computer system, as set forth in claim 1, wherein at least one of the plurality of memory cartridges is configured to store parity data.

7. The computer system, as set forth in claim 1, wherein each memory controller is configured to control access to the at least one memory device on the corresponding memory cartridge.

8. The computer system, as set forth in claim 1, wherein the data controller writes data in a striped fashion across the plurality of memory cartridges.

9. The computer system, as set forth in claim 1, wherein each of the plurality of control mechanisms is configured to independently facilitate the transition of the corresponding memory cartridge to one of a redundant-ready state, a powerdown state, a powerup state, a disable-down state, a disable-up state, and a verify/replace state.

10. A method of hot-plugging a memory cartridge comprising the acts of:
    (a) operating the memory cartridge in a redundant-ready state;
    (b) transitioning the memory cartridge from the redundant-ready state to a disable-down state to facilitate a de-assertion sequence of control signals;
    (c) transitioning the memory cartridge from the disable-down state to a powerdown state wherein power is de-asserted to the memory cartridge;
    (d) replacing at least a portion of the memory cartridge;
    (e) transitioning the memory cartridge from the powerdown state to a powerup state wherein power is asserted to the memory cartridge;
    (f) transitioning the memory cartridge from the powerup state to a disable-up state to facilitate an assertion sequence of control signals;
    (g) transitioning the memory cartridge from the disable-up state to a verify/replace state to verify the proper functionality of the memory cartridge and to replace data stored in the memory cartridge with valid system data; and
    (h) transitioning the memory cartridge from the verify/replace state to the redundant-ready state.

11. The method, as set forth in claim 10, wherein act (a) comprises the act of utilizing error correction code to correct errors to prevent the occurrence of a fault.

12. The method, as set forth in claim 10, wherein act (c) comprises the act of driving all write interface outputs and all read interface inputs to a logical zero.

13. The method, as set forth in claim 10, wherein act (d) comprises the act of replacing at least one memory device on the memory cartridge.

14. The method, as set forth in claim 10, wherein act (d) comprises the act of replacing the memory cartridge with a different memory cartridge.

15. The method, as set forth in claim 10, wherein act (e) comprises the act of driving all write interfaces to an idle state and all read interface inputs to a tristate condition.

16. The method, as set forth in claim 10, wherein act (g) comprises the acts of:
    writing data to the memory cartridge; and
    reading the data from the memory cartridge.

17. The method of claim 16, wherein the acts are performed in the recited order.

18. A of operating a memory system in a redundant mode, the memory system comprising a plurality of memory cartridges, comprising the act of independently transitioning each of the plurality of memory cartridges to a redundant-ready state, wherein the act of independently transitioning each of the plurality of memory cartridges to a redundant-ready state, comprises the act of independently transitioning each of the plurality of memory cartridges to a redundant-ready state from a disable-down state.

19. A of operating a memory system in a redundant mode, the memory system comprising a plurality of memory cartridges, comprising the act of independently transitioning each of the plurality of memory cartridges to a redundant-ready state, wherein the act of independently transitioning each of the plurality of memory cartridges to a redundant-ready state, comprises the act of independently transitioning each of the plurality of memory cartridges to a redundant-ready state from a disable-up state.

20. A of operating a memory system in a redundant mode, the memory system comprising a plurality of memory cartridges, comprising the act of independently transitioning each of the plurality of memory cartridges to a redundant-ready state, wherein the act of independently transitioning each of the plurality of memory cartridges to a redundant-ready state, comprises the act of independently transitioning each of the plurality of memory cartridges to a redundant-ready state from a verify/replace state.

* * * * *